US012625971B2

(12) United States Patent　　　　(10) Patent No.:　US 12,625,971 B2

Kim et al.　　　　　　　　　　　　(45) Date of Patent:　May 12, 2026

(54) METHOD AND APPARATUS OF ANOMALY DETECTION OF SYSTEM LOGS BASED ON SELF-SUPERVISED LEARNING

(71) Applicant: Autocrypt Co., Ltd., Seoul (KR)

(72) Inventors: Duk Soo Kim, Seoul (KR); Eui Seok Kim, Seoul (KR); Sang Gyoo Sim, Seoul (KR); Ki Ho Joo, Seoul (KR); Jung Won Lee, Seongnam-si (KR); Jong Guk Lee, Suwon-si (KR); Jung Wook Kim, Seoul (KR); Sang Seok Lee, Seoul (KR); Seung Young Park, Chuncheon-si (KR)

(73) Assignee: Autocrypt Co., Ltd., Seoul (KR)

( * ) Notice: Subject to any disclaimer, the term of this patent is extended or adjusted under 35 U.S.C. 154(b) by 541 days.

(21) Appl. No.: 18/364,404

(22) Filed: Aug. 2, 2023

(65) Prior Publication Data

US 2024/0078320 A1　　Mar. 7, 2024

(30) Foreign Application Priority Data

Sep. 7, 2022　(KR) ........................ 10-2022-0113456

(51) Int. Cl.
　　*G06F 21/57*　　　(2013.01)
　　*G06F 21/55*　　　(2013.01)
　　*G06F 40/166*　　(2020.01)
(52) U.S. Cl.
　　CPC .......... *G06F 21/577* (2013.01); *G06F 21/552* (2013.01); *G06F 40/166* (2020.01)
(58) Field of Classification Search
　　CPC .... G06F 21/577; G06F 21/552; G06F 40/166; G06F 40/30; G06F 11/3495; G06F 18/24; G06F 40/205; G06F 40/284; G06F 2201/81; G06N 3/09

USPC ......................................................... 706/25
See application file for complete search history.

(56) References Cited

U.S. PATENT DOCUMENTS

| | | | | |
|---|---|---|---|---|
| 12,475,688 B2 * | 11/2025 | Kascenas | ............. | G06V 10/774 |
| 2020/0096187 A1 * | 3/2020 | Ter Weeme | ............. | F21V 29/70 |
| 2024/0033940 A1 * | 2/2024 | Schonherr | ................ | A01G 7/06 |

FOREIGN PATENT DOCUMENTS

| | | |
|---|---|---|
| KR | 10-1964412 B1 | 4/2019 |
| KR | 10-2020-0096187 B1 | 8/2020 |

OTHER PUBLICATIONS

Shayan Hashemi, SiaLog: detecting anomalies in software execution logs using the siamese network, 2022 (Year: 2022).*

* cited by examiner

*Primary Examiner* — Tarek Elchanti

(74) *Attorney, Agent, or Firm* — BROADVIEW IP LAW, PC

(57) ABSTRACT

Disclosed is a method and apparatus for detecting anomalies in a system log on the basis of self-supervised learning, using a language model. The method comprises performing preprocessing on the system log, generating a normal token sequence having a preset length by concatenating tokenized log lines of the system log, generating an abnormal token sequence using the normal token sequence, calculating an anomaly score for a determination target token sequence using a sentence classification model, and determining the token sequence as an abnormal system log when the calculated anomaly score is greater than a threshold value.

16 Claims, 10 Drawing Sheets

METHOD AND APPARATUS OF ANOMALY DETECTION OF SYSTEM LOGS BASED ON SELF-SUPERVISED LEARNING

CROSS-REFERENCE TO RELATED APPLICATIONS

This application claims priority to Korean Patent Application No. 10-2022-0113456, filed on Sep. 7, 2022, with the Korean Intellectual Property Office (KIPO), the entire contents of which are hereby incorporated by reference.

BACKGROUND

1. Technical Field

The present disclosure relates to a method and apparatus for detecting anomalies in a system log on the basis of self-supervised learning, using a language model.

2. Related Art

A log file refers to a file that records events or communication messages with the outside, which are generated when an operating system or software of a computing device is executed. An event log is records of an event generated when a system is executed to monitor and track operations or actions of a computer system, and is used to understand system activities and diagnose problems. Event logs are also referred to as system logs.

Anomaly detection is a technique of detecting values that are not 'normal', i.e., those defined as an abnormal value, according to data or systems. Log anomaly detection among the anomaly detection is a technique of tracking causes of a failure by viewing the log recorded by the system, and it generally deals with text data and uses a simple technique based on pattern matching to solve problems.

On the other hand, when failure messages are continuously added or excluded, log anomaly detection is difficult to solve the problems by applying pattern matching. Therefore, the problems described above are solved recently by performing log anomaly detection using a methodology based on deep learning.

The anomaly detection technique based on deep learning is classified into anomaly detection based on supervised learning, anomaly detection based on semi-supervised learning (one-class), and anomaly detection based on unsupervised learning, according to whether an abnormal sample is used and whether there is a label, and unsupervised learning anomaly detection methodology based on an autoencoder is mainly used for anomaly detection based on unsupervised learning.

As described above, although the anomaly detection technique uses a methodology based on deep learning to increase its coverage and reliability, even now, there is still a demand for a light and fast new methodology for anomaly detection technique based on deep learning, or a demand for improved performance and higher reliability of anomaly detection.

SUMMARY

The present disclosure has been derived to meet the needs of the prior art described above, and an object of the present disclosure is to provide a method and apparatus for detecting anomalies in a system log, in which a cut-and-paste technique used for existing abnormal image detection is applied to anomaly detection based on a language model.

Another object of the present disclosure is to provide a method and apparatus for detecting anomalies in a system log on the basis of self-supervised learning, which can effectively determine system log anomalies by adopting, when the cut-and-paste technique is applied to anomaly detection based on a language model, a method of training a sentence classification model using generation of a preprocessed normal token sequence and an abnormal token sequence generated from the normal token sequence, calculating an anomaly score for a determination target token sequence input into the sentence classification model, and comparing the calculated anomaly score with a threshold value.

According to a first exemplary embodiment of the present disclosure, a method of detecting anomalies in a system log on the basis of self-supervised learning may comprise: performing preprocessing on the system log; generating a normal token sequence having a preset length by concatenating tokenized log lines of the system log; generating an abnormal token sequence using the normal token sequence; calculating an anomaly score for a determination target token sequence using a sentence classification model; and determining, when the calculated anomaly score is greater than a threshold value, the token sequence as an abnormal system log.

The system log anomaly detection method may further comprise inputting the normal token sequence and the abnormal token sequence into the sentence classification model, and training the sentence classification model to minimize a preset loss.

The determining may include sequentially selecting and masking token subsequences in units of log lines from the determination target token sequence.

The determining may further include calculating a loss for each sequentially selected and masked token subsequence.

The determining may further include determining an abnormal token sequence on the basis of an anomaly score obtained by summing the calculated loss of each token subsequence.

The generating of an abnormal token sequence may use a method of deleting some log lines among the log lines of the normal token sequence.

The generating of an abnormal token sequence may use a method of adding log lines generated at other arbitrary time points to the normal token sequence.

The generating of an abnormal token sequence may use a method of swapping some log lines of the normal token sequence with log lines generated at different time points.

The calculating of an anomaly score may include calculating the anomaly score using a negative log likelihood (NLL) of a Gaussian density estimation (GDE) or a kernel density estimation (KDE) for a feature vector obtained from the sentence classification model.

The performing of preprocessing may include: removing numbers and special characters from the system log; and removing single alphabets with leading and trailing spaces or alphabets of a specific length or shorter.

The performing of preprocessing may include converting each log line, from which the alphabets are removed, into a token subsequence using a tokenizer.

The performing of preprocessing may further include, when a length of the token subsequence generated through the converting step is greater than an arbitrary first length, allowing the length of the generated token subsequence to be only as long as the first length.

The generating of a normal token sequence may include generating a normal token sequence, of which a maximum length is a second length, by concatenating token subsequences.

The generating of a normal token sequence may further include inserting a special token between two adjacent token subsequences to distinguish the two token subsequences.

According to a second exemplary embodiment of the present disclosure, an apparatus for detecting anomalies in a system log on the basis of self-supervised learning may comprise: a processor; and a memory for storing at least one command executed by the processor, wherein the processor is configured to perform, by the at least one command, performing preprocessing on the system log; generating a normal token sequence having a preset length by concatenating tokenized log lines of the system log; generating an abnormal token sequence using the normal token sequence; calculating an anomaly score for a determination target token sequence using a sentence classification model; and determining, when the calculated anomaly score is greater than a threshold value, the token sequence as an abnormal system log.

The processor may be configured to further perform inputting the normal token sequence and the abnormal token sequence into the sentence classification model, and training the sentence classification model to minimize a preset loss.

The processor may configured to perform, at the determining, sequentially selecting and masking token subsequences in units of log lines from the determination target token sequence; calculating a loss for each sequentially selected and masked token subsequence; and determining an abnormal token sequence on the basis of an anomaly score obtained by summing the calculated loss of each token subsequence.

In the generating of an abnormal token sequence, the processor may delete some log lines among the log lines of the normal token sequence.

In the generating of an abnormal token sequence, the processor may add log lines generated at other arbitrary time points to the normal token sequence.

In the generating of an abnormal token sequence, the processor may swap some log lines of the normal token sequence with log lines generated at different time points.

According to the present disclosure described above, there is an effect of providing a new anomaly detection methodology that can effectively detect anomalies in a system log by applying a cut-and-paste technique used for existing abnormal image detection.

In addition, according to the present disclosure, there is an effect of providing a method and apparatus for detecting anomalies in a system log on the basis of self-supervised learning, which can effectively determine system log anomalies by adopting, when the cut-and-paste technique is applied to anomaly detection based on a language model, a method of training a sentence classification model using generation of a preprocessed normal token sequence and an abnormal token sequence generated from the normal token sequence, calculating an anomaly score for a determination target token sequence input into the sentence classification model, and comparing the calculated anomaly score with a threshold value.

DETAILED DESCRIPTION OF THE EMBODIMENTS

Figure 1:
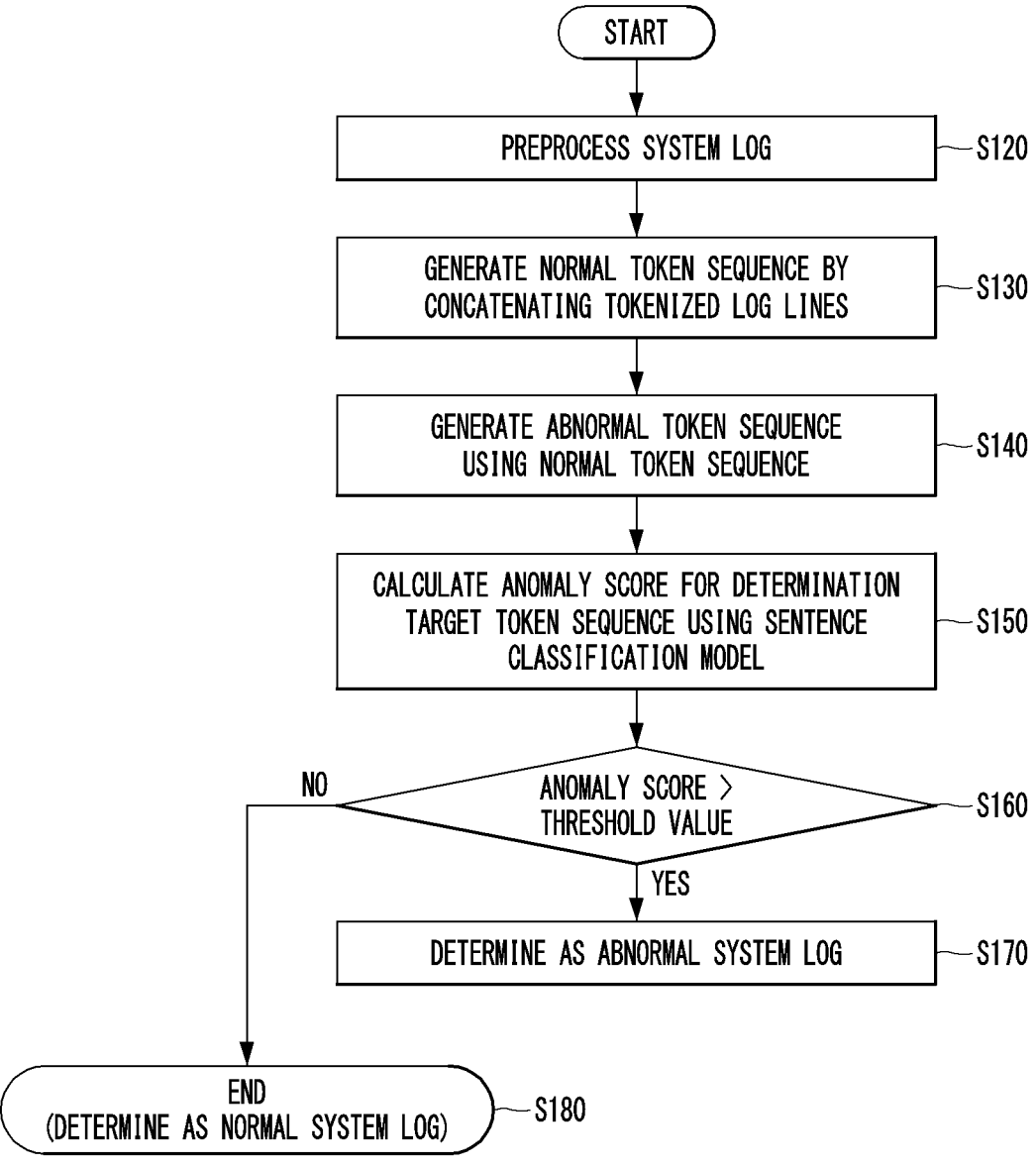
FIG. 1 is a flowchart illustrating a system log anomaly detection method based on self-supervised learning according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a flowchart illustrating a system log anomaly detection method based on self-supervised learning according to an embodiment of the present disclosure.

Referring to FIG. 1, a system log anomaly detection method based on self-supervised learning (hereinafter, simply referred to as 'anomaly detection method') may include the following steps.

That is, the anomaly detection method may include the steps of performing preprocessing on a system log, generating a normal token sequence having a preset length by concatenating tokenized log lines of the system log, generating an abnormal token sequence using the normal token sequence, calculating an anomaly score for a determination target token sequence using a sentence classification model, and determining, when the calculated anomaly score is greater than a threshold value, the token sequence as an abnormal system log.

Describing each of the steps in more detail, the step of performing preprocessing may be configured to include the steps of removing numbers and special characters from the system log, and removing single alphabets with leading and trailing spaces or alphabets of a specific length or shorter. In addition, the step of performing preprocessing may be configured to further include the step of converting each log line, from which single alphabets or alphabets shorter than a specific length are removed, into a token subsequence using a tokenizer.

Furthermore, the step of performing preprocessing may be configured to further include the step of, when the length of the token subsequence generated through the converting step is greater than an arbitrary first length, allowing the length of the generated token subsequence to be only as long as the first length.

In addition, the step of generating a normal token sequence may be configured to include the step of generating a normal token sequence, of which a maximum length is an arbitrary second length, by concatenating token subsequences. In addition, the step of generating a normal token sequence may be configured to further include the step of inserting a special token between two adjacent token subsequences to distinguish the two token subsequences.

In addition, the step of generating an abnormal token sequence may use a method of deleting some log lines among the log lines of a normal token sequence. On the other hand, the step of generating an abnormal token sequence may be configured to generate the abnormal token sequence by adding log lines generated at other arbitrary time points to the normal token sequence. On the other hand, the step of generating an abnormal token sequence may be configured to generate the abnormal token sequence by swapping some log lines of the normal token sequence with log lines generated at different time points.

In addition, the step of calculating an anomaly score may be configured to calculate an anomaly score corresponding to the loss of the determination target token sequence on the basis of a feature vector obtained from the sentence classification model.

In addition, the step of calculating an anomaly score may be configured to calculate the anomaly score using the negative log likelihood (NLL) of the Gaussian density estimation (GDE) or the kernel density estimation (KDE) for the feature vector. At this point, a density estimator based on the GDE or KDE may be configured to model only the probability density for a normal token sequence. According to the configuration like this, it can be expected that the probability density estimate for the abnormal token sequence is very low.

Figure 2:
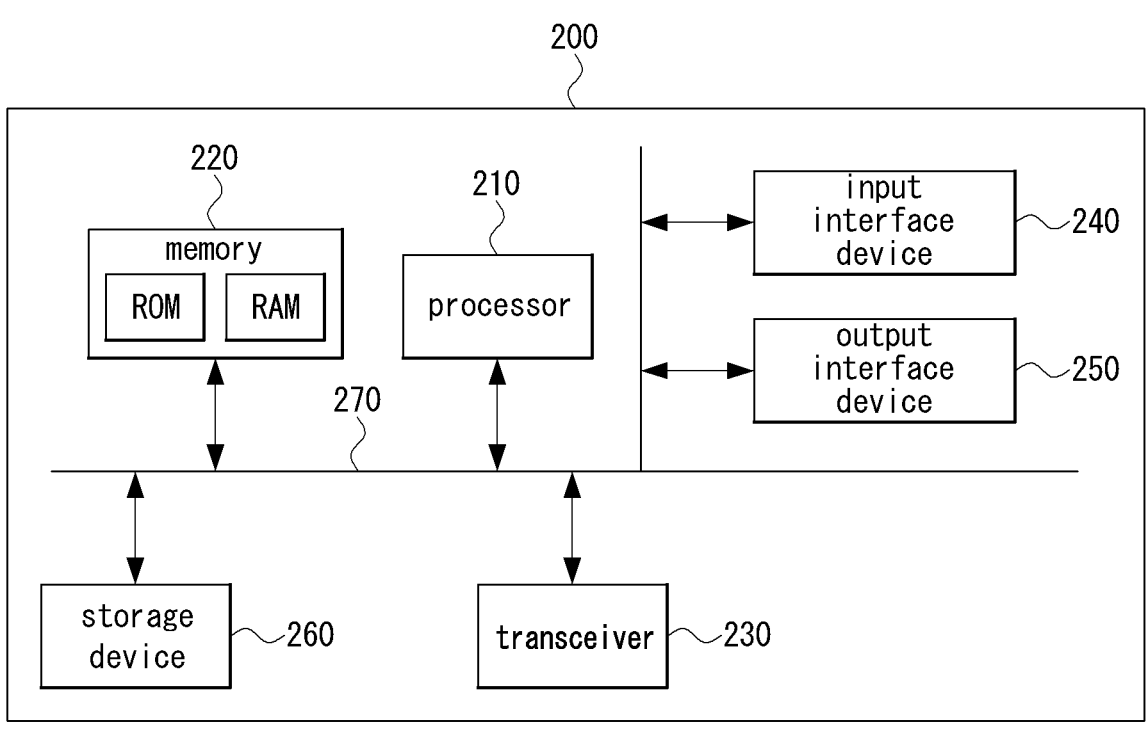
FIG. 2 is a schematic block diagram showing a system log anomaly detection apparatus that can employ the system log anomaly detection method of FIG. 1.

FIG. 2 is a schematic block diagram showing a system log anomaly detection apparatus that can employ the system log anomaly detection method of FIG. 1.

Referring to FIG. 2, the system log anomaly detection apparatus 200 may be configured to include at least one processor 210 and a memory 220 for storing at least one command executed by the processor 210. In addition, the control device 200 may be configured to further include a transceiver 230 connected to a wired network, a wireless network, a satellite network, or a combination thereof to perform communication.

In addition, the control device 200 may be configured to further include, selectively as needed, an input interface device 240, an output interface device 250, a storage device 260, and the like. Each component included in the control device 200 may be connected by a bus 270 to perform communication with each other, or may be connected through an individual interface or an individual bus centering around the at least one processor 210. For example, the processor 210 may be connected to at least one among the memory 220, the transceiver 230, the input interface device 240, the output interface device 250, and the storage device 260 through a dedicated interface.

The processor 210 may execute program commands stored in at least one among the memory 220 and the storage device 260. The processor 210 may be configured to perform the steps of, by at least one command or program command, performing preprocessing on a system log, generating a normal token sequence having a preset length by concatenating tokenized log lines of the system log, generating an abnormal token sequence using the normal token sequence, calculating an anomaly score for a determination target token sequence using a sentence classification model, and determining, when the calculated anomaly score is greater than a threshold value, the token sequence as an abnormal system log.

In addition, the processor 210 of the anomaly detection apparatus 200 may be configured to further perform the step of, by at least one command, inputting a normal token sequence and an abnormal token sequence into the sentence classification model, and training the sentence classification model to minimize a preset loss.

The processor 210 like this may refer to a central processing unit (CPU), a graphics processing unit (GPU), or a dedicated processor on which the methods according to the embodiments of the present disclosure are performed.

Each of the memory 220 and the storage device 260 may be configured of at least one among a volatile storage medium and a non-volatile storage medium. For example, the memory 220 may be configured of at least one among read-only memory (ROM) and random-access memory (RAM).

The transceiver 230 may include a communication interface or a sub-communication system for connection through a short-range wireless network or a cable, connection with a satellite, connection with a base station of a mobile communication network, connection of an ideal backhaul link or non-ideal backhaul link of a base station to a mobile edge core network or a core network, or the like. That is, the transceiver 230 may include a communication node, a communication interface of a communication terminal, or a sub-communication system, which generates a system log.

The input interface device 240 may include at least one that is selected among input means such as a keyboard, a microphone, a touch pad, a touch screen, and the like, and an input signal processing unit for mapping or processing a signal input through at least one input means with a previously stored command.

The output interface device 250 may include at least one that is selected among an output signal processing unit for mapping or processing an output signal in the form or level of a previously stored signal under the control of the processor 210, and at least one output means for outputting a signal or information in the form of vibration, light, or the like according to the signal of the output signal processing unit. The at least one output means may include at least one that is selected among output means such as a speaker, a display device, a printer, an optical output device, a vibration output device, and the like.

For example, an anomaly detection apparatus may collect system logs from a Linux-based system and generate a token sequence using a sentence-piece tokenizer configured of 1,000 tokens. At this point, the maximum length of the input token sequence may be set to 512. In addition, the anomaly detection apparatus may be trained to minimize the loss parameter using a preloaded BERT-based model, or may detect anomalies by calculating an anomaly score for a token sequence of the log of a determination target system. Here, the model may include, for example, a neural network structure of which the hidden size is 768, the number of attention heads is 12, and the number of layers is 12.

In addition, as a method of generating an abnormal system log, a method of removing log lines from a normal log at an arbitrary probability, a method of adding (inserting) log lines generated at arbitrary time points to a normal log at an arbitrary probability, or the like may be applied.

Figure 3:
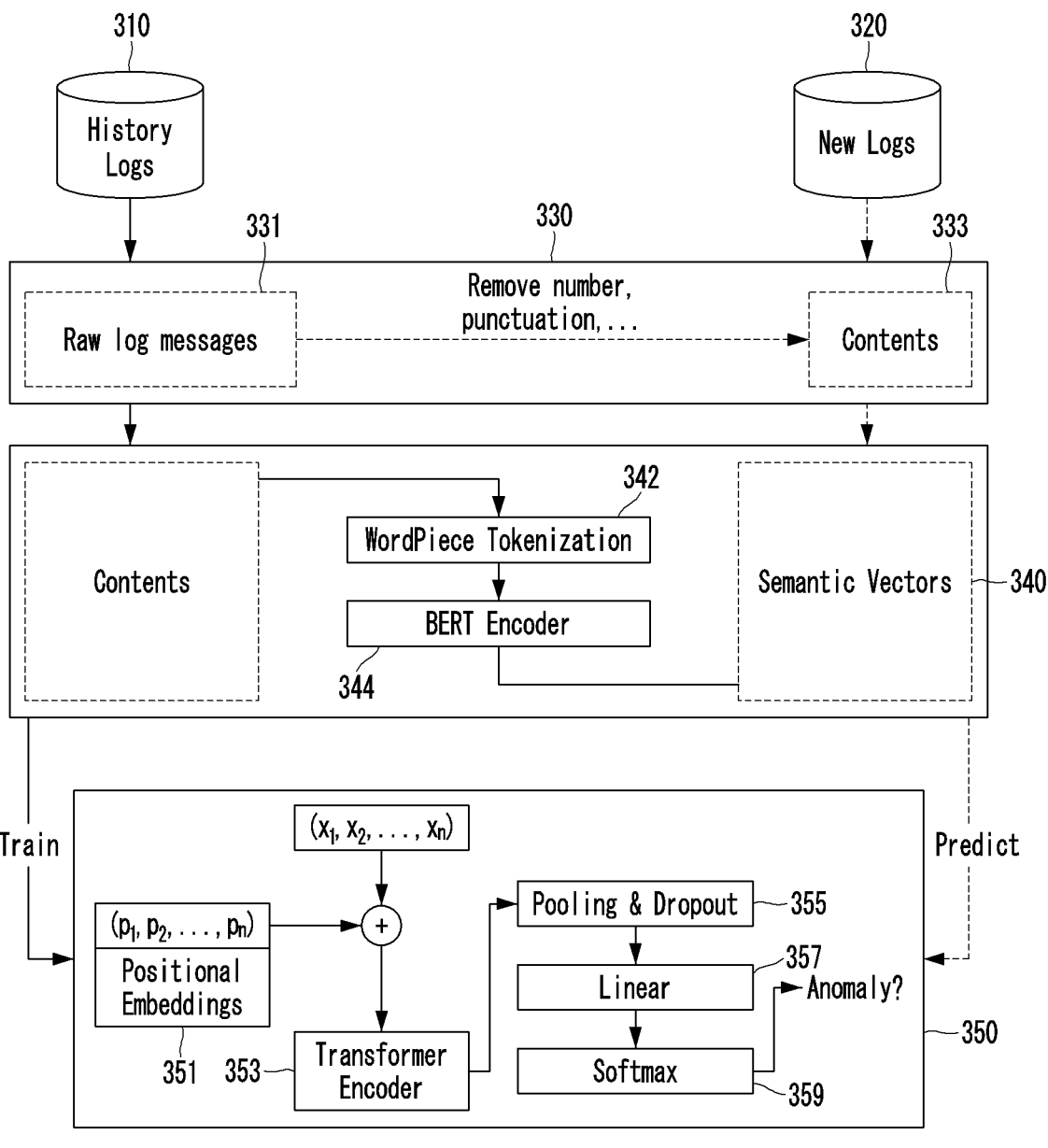
FIG. 3 is an exemplary view for explaining a language model of a comparative example.

FIG. 3 is an exemplary view for explaining a language model of a comparative example.

Referring to FIG. 3, the language model of the comparative example is a 'method of detecting anomalies on the basis of a log without log parsing' referred to as NeuralLog (hereinafter, simply referred to as a 'first comparative example'), and removes numbers, special characters, or the like from raw log messages 331 of each log line of the history logs 310 and the new logs 320 (330), performs tokenization on each word piece of the contents 333 generated as such (342), converts tokens into a semantic vector 340 of a predetermined length through a BERT encoder 344. In addition, supervised learning is performed on the converted semantic vector through training and prediction of the language model 350 including the transformer-based encoder 353 to determine whether there is an anomaly. In the language model 350, positional embeddings 351 are combined with the semantic vector (x1, x2, . . . xn) and input into the encoder, and the output of the encoder 353 passes through the pooling & dropout 355, the linear 357, and the softmax (359), and a final training value or prediction value may be output. The output prediction value is used to detect anomalies in the analysis target input.

Since the language model of the first comparative example applies supervised learning, a label should exist for the log, and the label has a disadvantage of increasing the manpower and cost in implementing a method and apparatus for detecting system logs.

Figure 4A:
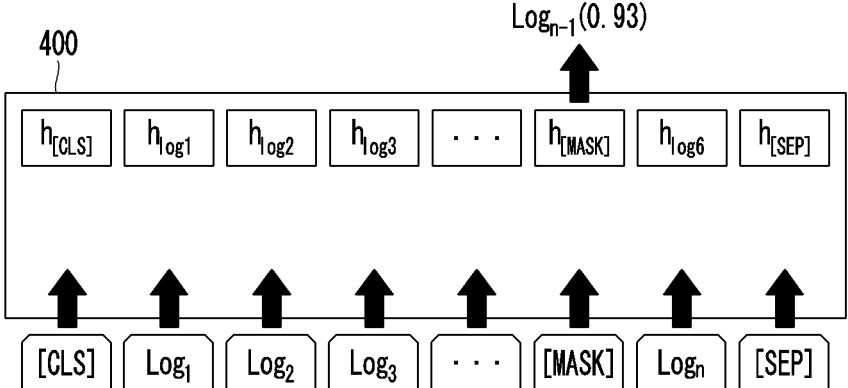
FIGS. 4A and 4B and FIG. 5 are exemplary views for explaining a system log anomaly detection technique using a language model of another comparative example.
Figure 4B:
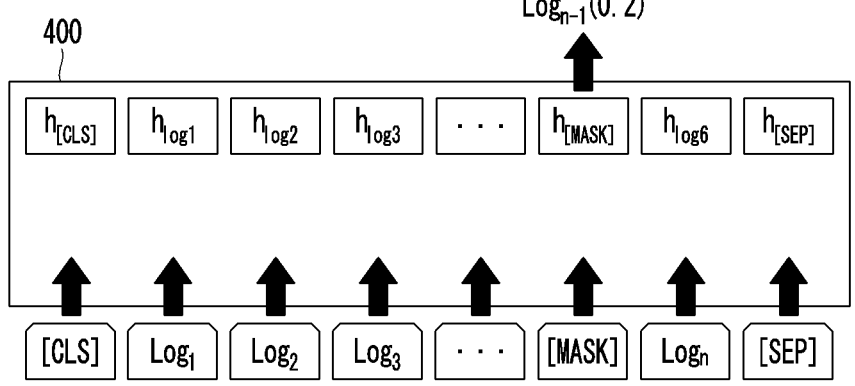
Figure 5:
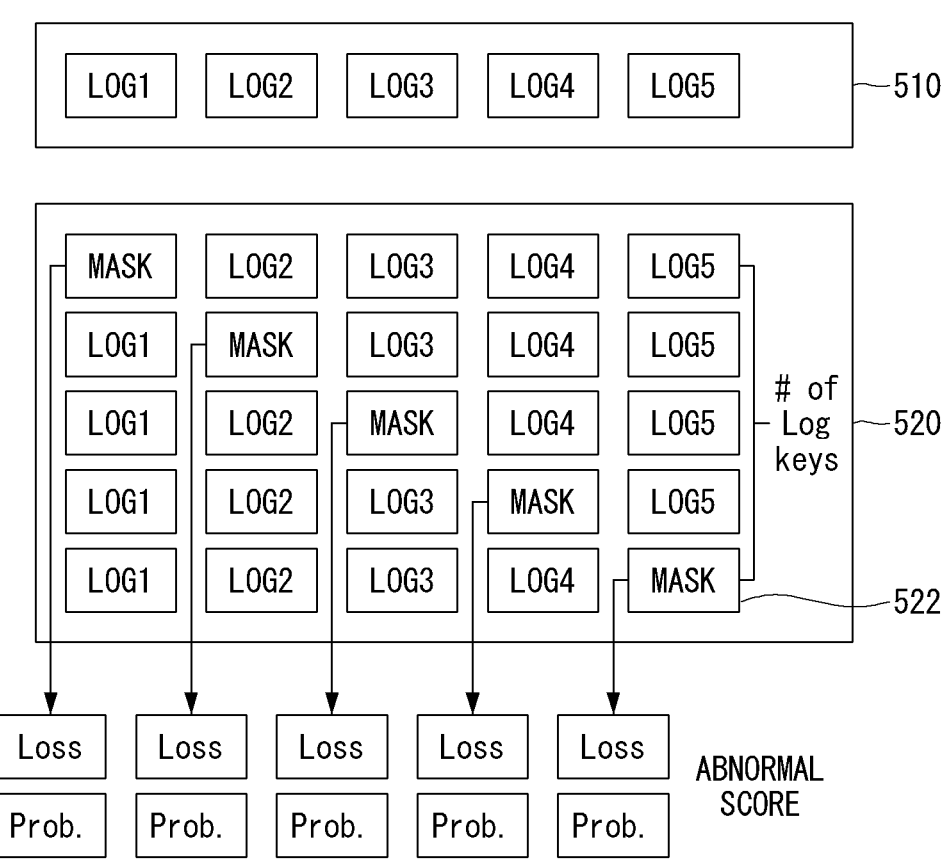

FIGS. 4A and 4B and FIG. 5 are exemplary views for explaining a system log anomaly detection technique using a language model of another comparative example.

The system log anomaly detection technique using a language model of another comparative example (hereinafter, simply referred to as a 'second comparative example') converts numbers, IP addresses, and the like that can be changed into the words 'NUM', 'IP', and the like, respectively, and then converts several log lines into one long sentence by connecting the log lines consecutively. Then, the system log anomaly detection method converts the words constituting the sentence into token subsequences by applying a tokenizer, and generates a token sequence by connecting the converted token subsequences in order of occurrence. Then, the system log anomaly detection method performs training by applying masked language modeling.

At this point, as shown in FIG. 4A and FIG. 4B, randomly selected 20% of tokens are masked (MASK), and training of predicting masked tokens is performed by applying a BERT model 400. After the training is completed, in an inference process, as shown in FIG. 5, probabilities of corresponding words are calculated by sequentially applying 520 masking (MASK) 522 to logs (LOG 1 to LOG 5) 510 of input words, and k probabilities, losses, or logits having the highest probability value (prob.) among them are added, and an abnormal system log is determined on the basis of the added anomaly score.

On the other hand, in the second comparative example, in the case where a log for a specific process is generated more frequently than usual by an attacker, and a change occurs in the log line generation pattern (however, in most cases where each log line itself is not new at all), when a corresponding token is predicted by applying masking to a token sequence, the BERT language model predicts the token using only token information around the token in order to maximize prediction performance. This is since that as the types of log lines are not as diverse as general natural languages, prediction with a sufficiently high accuracy is possible only by using token information around the token. Therefore, there is a limit in that when the sequence of log line occurrence is changed by an attacker, it is difficult to detect the change in the system log made by the attacker since the log line itself is not changed significantly.

Figure 6:
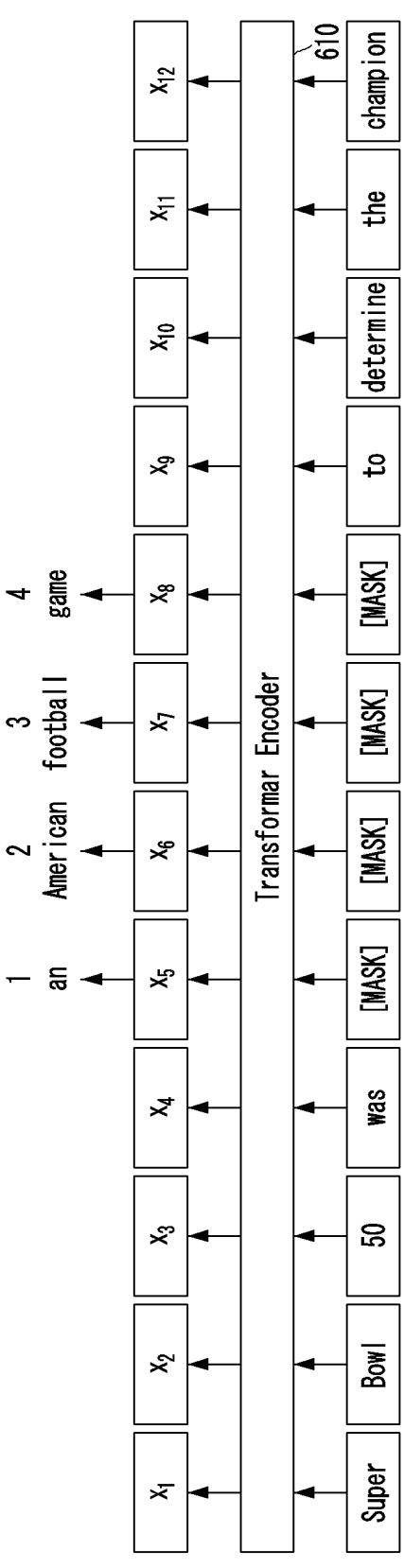
FIG. 6 is an exemplary view for explaining a system log anomaly detection technique using a language model according to another comparative example.
Figure 7:
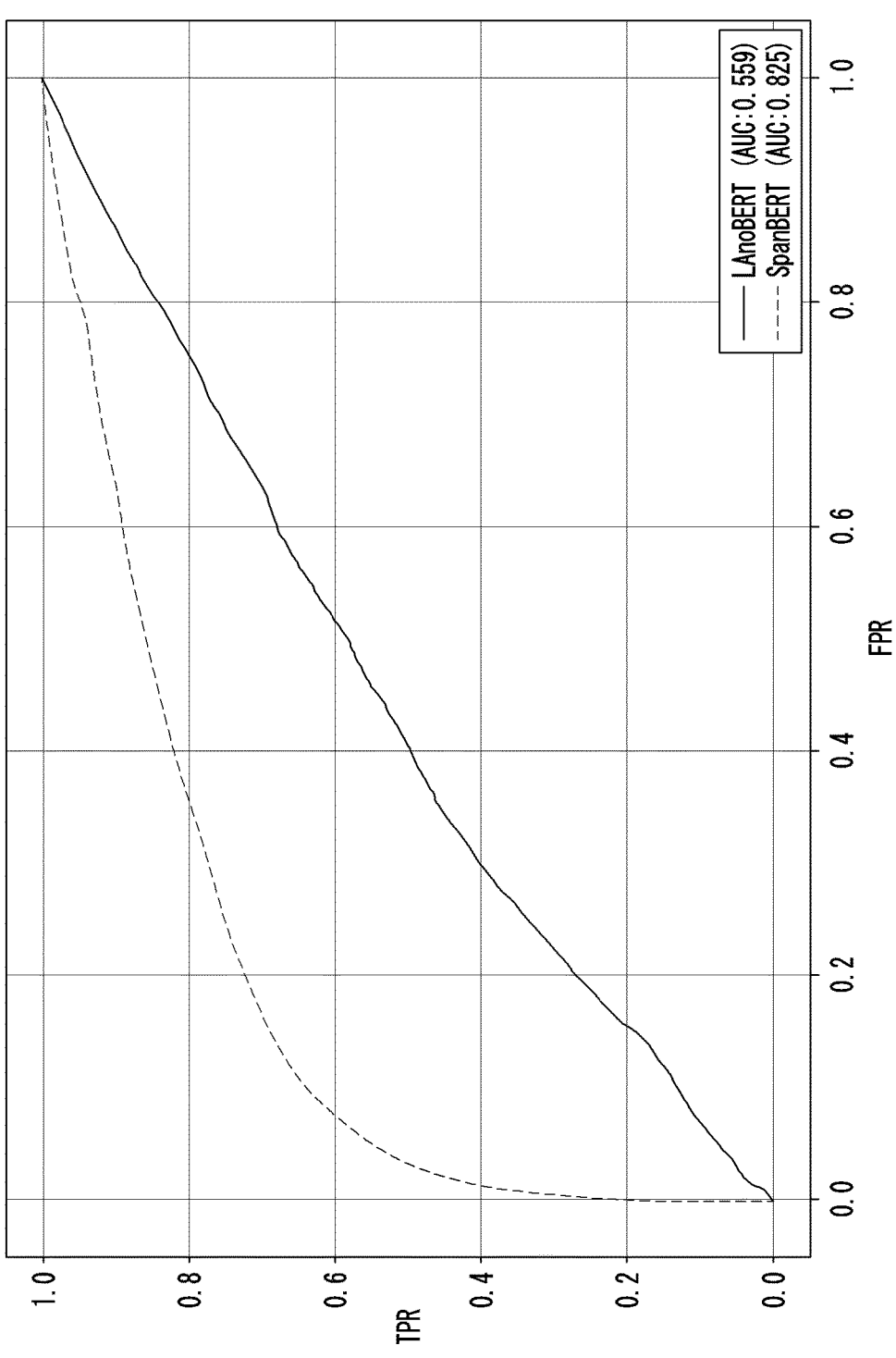
FIGS. 7 and 8 are graphs showing performance of anomaly log detection by the system log anomaly detection method of FIG. 6 in comparison with other comparative examples.
Figure 8:
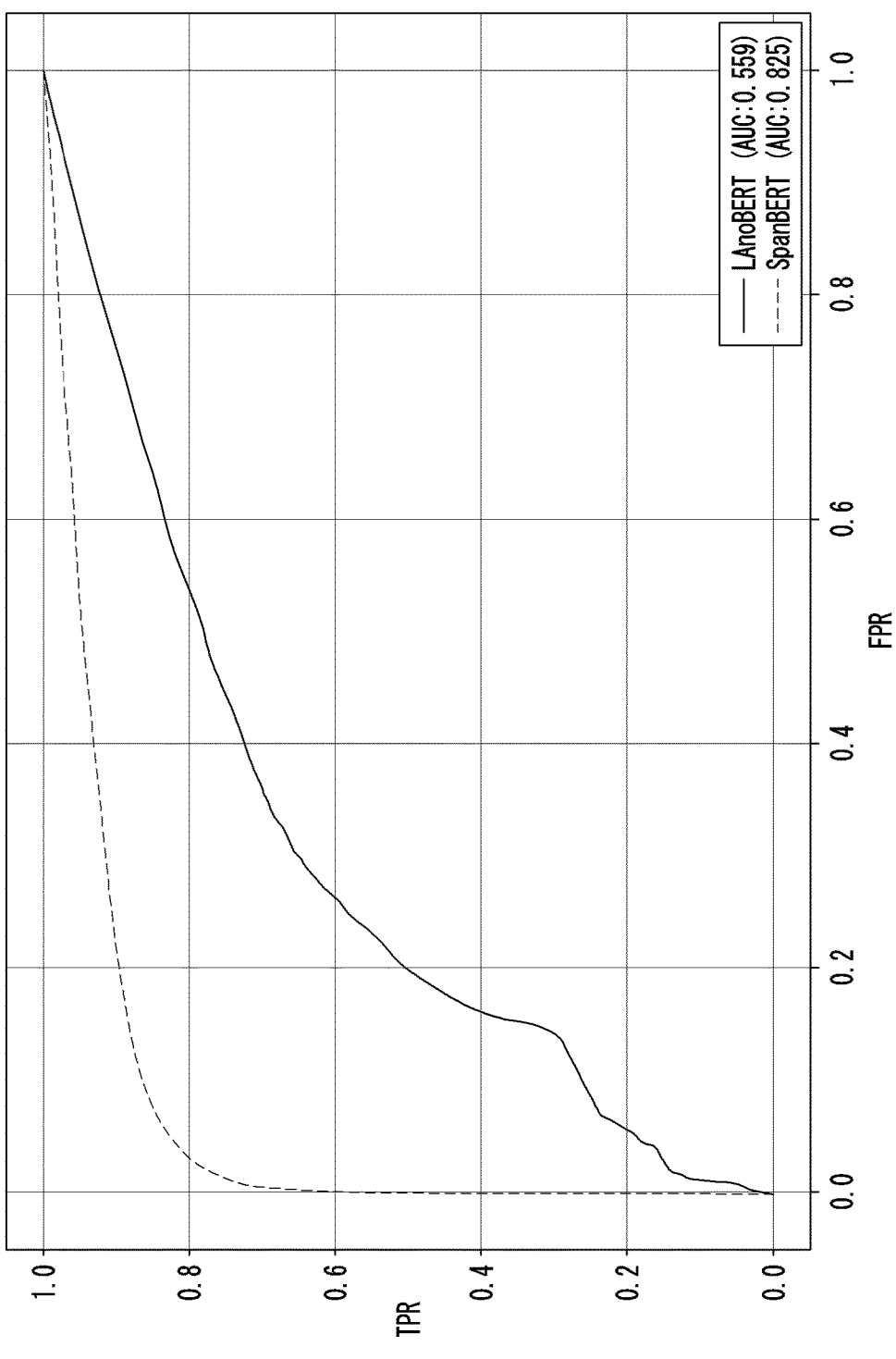

FIG. 6 is an exemplary view for explaining a system log anomaly detection technique using a language model according to another comparative example. FIGS. 7 and 8 are graphs showing performance of anomaly log detection by the system log anomaly detection method of FIG. 6 in comparison with other comparative examples.

Referring to FIG. 6, a language model 610 is a comparative example that improves performance of an existing BERT model (hereinafter, simply referred to as a 'third comparative example'), and training is performed on the language model using a masked language model (MLM). At this point, training is performed to mask tokens in arbitrary positions and predict corresponding tokens. At this point, since the tokenizer allocates multiple tokens by dividing words, rather than allocating tokens in units of words, such token unit masking cannot be considered as training by masking complete words.

In addition, when training is performed by applying the MLM as it is, since only some of words are masked and predicted, it is highly probable that the language model mainly learns the meaning with respect to surrounding tokens, rather than learning the meaning of a corresponding masked token in the entire sentence.

To solve this problem, training is performed using a span masking language model 610 of a method of masking all tokens constituting consecutive words and learning the tokens. The language model 610 of the third comparative example may be referred to as 'SpanBERT', and is trained to minimize the sum of MLM loss and span boundary objective (SBO) loss.

Meanwhile, the language model of the third comparative example calculates an MLM loss and an SBO loss for an arbitrary token among the masked tokens, and detects an anomaly in the text based on a result of training that minimizes the two losses.

In the third comparative example, compared with the second comparative example (LAonBERT), it is confirmed as shown in FIG. 7 that in the case of applying a method of generating an abnormal token sequence in a method of removing, when a log line is removed with a probability of 0.1 for each log line constituting a normal system log, about 30% of anomaly log is detected under the condition that a false alarm almost does not occur.

In addition, in this third comparative example, compared with the second comparative example (LAonBERT), as shown in FIG. 8, in the case of applying a method of generating an abnormal token sequence in a method of insertion, when another log line generated at an arbitrary time point is added with a probability of 0.1 for each log line constituting a normal system log, about 50% of anomaly log is detected under the condition that a false alarm almost does not occur.

For reference, in the case of the second comparison example (LAnoBERT) for detecting anomalies in a system log using a BERT-based masked language model, since masked tokens may be estimated using masked surrounding token information, it can be seen that detection performance for an anomaly log of which the order of log lines changes is reduced relatively.

Figure 9:
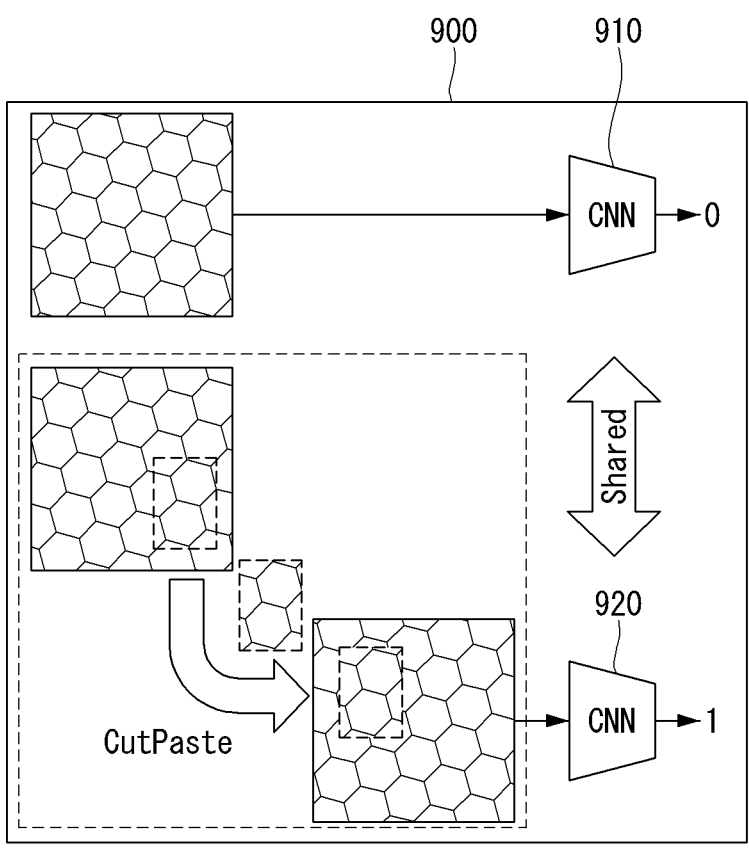
FIGS. 9 and 10 are exemplary views for explaining an abnormal image detection technique based on self-supervised learning, which can be employed in the anomaly detection method of FIG. 1.
Figure 10:
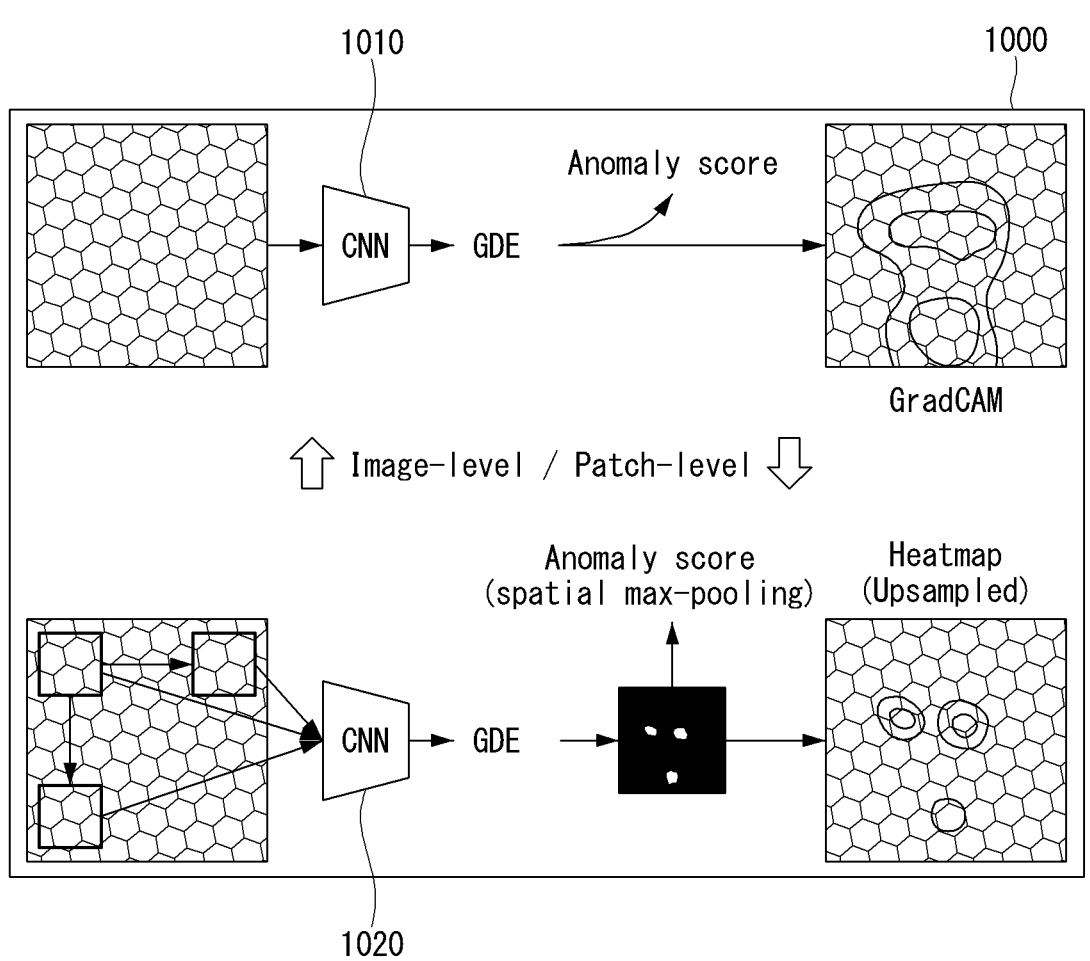

FIG. 9 and FIG. 10 are exemplary views for explaining an abnormal image detection technique based on self-supervised learning, which can be employed in the anomaly detection method of FIG. 1.

The anomaly detection method of this embodiment uses an abnormal image detection technique based on self-supervised learning in a language model for system log anomaly detection.

An abnormal image detection technique that can be used in a language model for system log anomaly detection generates, as shown in FIG. 9, an abnormal image using augmentation of a method of cutting and pasting parts of a normal image (Cutpaste) in an image model 900. Then, a normal image is input into a first convolutional neural network (CNN) 910, and the abnormal image is input into a second CNN 920 that is the same as the first CNN 910, and then, each CNN makes a determination to minimize the loss. At this point, a normal label is 0, and an abnormal label is 1.

In addition, the abnormal image detection technique may operate in a way of calculating a predefined anomaly score for an image to be determined and determining as an abnormal image when a corresponding value is greater than a threshold value, by an abnormal image detection apparatus 1000. For example, the abnormal image detection technique may operate in a way of defining the output of a specific layer, among several layers constituting the CNNs 1010 and 1020, as a feature vector, calculating an anomaly score using the negative log likelihood (NLL) of Gaussian density estimation (GDE) for the feature vector, visualizing to show in which part of the image an anomaly has occurred by applying the CNN output of the entire image to the Grad-CAMS technique, and visualizing whether or not an anomaly has occurred in a corresponding part by applying the CNN output of a part of the visualized image to the Grad-GAM technique.

That is, in this embodiment, the CutPaste technique used for abnormal image detection described above is applied to the system log anomaly detection technique based on a language model.

In addition, the system log anomaly detection method based on a language model first performs preprocessing on collected or input system logs using a preprocessing technique, and then performs token conversion. The preprocessing technique may include removing numbers and special characters, or removing single alphabets, i.e., alphabets with leading and trailing spaces.

Next, a normal token sequence having a maximum length of L is generated by concatenating log lines tokenized through preprocessing.

Generation of a normal token sequence may include generation of a token subsequence using a sentence-piece tokenizer, a word-piece tokenizer, or the like. A token subsequence of a predetermined length may be referred to as a log line.

For example, a token subsequence may be generated by preprocessing and tokenizing an original system log shown below.

[Original System Log]

> PHNX AG1 debug [jlr.webagent.jssdk]: DAO-5309: data.request [D] [18]: cloudcar.dao.checkConnection: failed: Http error
> PHNX WFC info [com_framework_wfc]: permissions_manager.hasPermissions( ) client_id:2api: phoenix.util.Logging.debug

[Preprocessing]

> PHNX AG debug jlr webagent j ssdk DAO data request cloudcar dao checkConnection failed Http error
> PHNX WFC info com framework wfc permissions manager hasPermissions client id api phoenix util Logging debug

[Tokenized Token Subsequence]

> 59, 90, 88, 7, 27, 94, 301, 311, 309, 316, 145, 651, 628, 222, 530, 509, 733, 494, 550, 532, 15, 779, 4
> 59, 90, 88, 104, 17, 217, 26, 241, 191, 256, 286, 9, 6, 154, 283, 220, 323, 202, 127, 141, 142, 94

The anomaly detection apparatus may be configured to allow the length of a token subsequence only up to an arbitrary first length M when the length of the token subsequence is longer than the first length M. That is, the anomaly detection apparatus may be configured to truncate the length of a token subsequence longer than the first length to be the first length (e.g., M=15) to limit the length of the token subsequence to the first length.

In this case, the tokenized token subsequence may have a form in which the latter part is truncated as shown below.

[Token Subsequence Limited to First Length]

59, 90, 88, 7, 27, 94, 301, 311, 309, 316, 145, 651, 628,
        222, 530
    59, 90, 88, 104, 17, 217, 26, 241, 191, 256, 286, 9, 6, 154,
        283

In addition, in generating a token sequence, it may be configured to generate a token sequence having a maximum length of L by concatenating token subsequences. L may be 36, but it is not limited thereto. At this point, a special token <x> may be inserted between two adjacent token subsequences to distinguish the token subsequences. An example of the token sequence generated in word units is as shown below.

[Word Talk Sequence]

<CLS> 59 90 88 7 27 94 301 311 309 316 145 651 628
        222 530 <x> 59 90 88 104 17 217 26 241 191 256 286
        9 6 154 283 <SEP> <pad><pad><pad>

Here, <CLS> represents a token inserted at the beginning of the first or 0-th log line, i.e., a special classification token, and <SEP> represents a boundary token. <CLS> and <SEP> tokens are excluded from boundary tokens described below. In addition, <pad> tokens may be added to match a preset length.

Next, an abnormal token sequence is generated using at least any one among a removal method, an insertion method, and a swap method using a normal token sequence. Here, the removal method may mean deleting some log lines and adding additional tokenized log lines to a shortened token sequence. The insertion method may mean adding log lines generated at different time points to a token sequence. In addition, the swap method may mean swapping some log lines with log lines generated at different time points.

Describing in more detail as an example, in generating an abnormal token sequence, any one or more methods among the removal, insertion, and swapping may be used in units of token subsequences. When removal is performed, a randomly selected token subsequence may be deleted, and token subsequences for other log lines generated immediately after the last log line constituting the token sequence may be added at the end of the shortened token sequence until a maximum allowed length is satisfied. When insertion is performed, a token subsequence for another log line generated immediately after the last log line constituting the token sequence may be added immediately after the randomly selected token subsequence. In addition, when swapping is performed, the 0-th log line may be replaced with a token subsequence that can be generated.

An example of performing swapping is as shown below.

[Before Performing Swapping]

<CLS> 59 90 88 7 27 94 301 311 309 316 145 651 628
        222 530 <x> 59 90 88 104 17 217 26 241 191 256 286
        9 6 154 283 <SEP> <pad><pad><pad>

[After Performing Swapping]

<CLS> 30 90 104 17 217 38 26 241 191 256 286 9 154
    283 <x> 59 90 88 104 17 217 26 241 191 256 286 9 6 154
    283 <SEP> <pad><pad><pad>

Although a token subsequence corresponding to one log line is swapped in the case of the technique of generating an abnormal sequence, it is not limited thereto, and it may be configured to perform removal, insertion, swapping, or a combination thereof for a token subsequence corresponding to two or more log lines when an abnormal token sequence is generated.

Next, a normal token sequence and an abnormal token sequence may be input into the same BERT-based sentence classification model to trained the sentence classification model to minimize the loss defined as shown in Equation 1 below.

$$\mathcal{L}_{CP} = \mathbb{E}_{x \in \chi} \{ \mathbb{CE}(g(x),0) + \mathbb{CE}(g(CP(x)),1) \} \qquad \text{[Equation 1]}$$

In Equation 1, $g(\bullet)$ represents a BERT-based sentence classification model, $\mathbb{CE}(\bullet)$ represents a cross entropy, and $CP(\bullet)$ represents a cut-and-paste operation.

Next, using the trained sentence classification model, a feature vector is generated for the determination target token sequence, and an anomaly score for the feature vector is calculated using GDE or KDE. At this point, the GDE or KDE may be generated using only the normal token sequence used in the training process.

Equation 2 below shows calculation of an anomaly score using GDE, and when a corresponding value is greater than a threshold value, it can be determined as an abnormal image.

$$-\log p_{gde}(x) \sim \left\{ \frac{1}{2}(f(x)-\mu)^T \sum^{-1} (f(x)-\mu) \right\} \qquad \text{[Equation 2]}$$

In Equation 2, $f(\bullet)$ represents a feature vector from convolutional neural network, that is the BERT-based sentence classification network, $\mu$ represents the mean of feature vectors, and $\Sigma$ represents the covariance matrix of the feature vectors.

Here, the feature vector may use the pooler output of a BERT-based model. That is, it may be an output that has passed through a linear layer and a tanh( ) activation function for a special classification token, i.e., a CLS token.

A process described below may be performed to use such a configuration. First, the pooler output of the BERT-based model passes through the uppermost linear layer to perform training to distinguish normal token sequences from abnormal token sequences. When the training is finished, the uppermost layer is removed, and the pooler output may be used as a feature vector.

When the negative log likelihood (NLL) of the Gaussian density estimation (GDE) or the kernel density estimation (KDE) for the feature vector generated as described above is used, an anomaly score may be effectively calculated. At this point, the GDE or KDE may be generated using only the feature vector of the normal token sequence used for training.

Describing another detection method as an example, in order to determine anomalies in a system log, token subsequences are sequentially selected in units of log lines from a token sequence to be determined, and a loss for the selected j-th token subsequence (j is an arbitrary natural number) may be calculated. For the calculation of the loss, one of the losses defined in Equations 3 to 5 may be used.

$$\mathcal{L}_j = \frac{1}{|Y_j|} \sum_{i \in Y_i} (\alpha \mathcal{L}_{MLM}(x_i) + \beta \mathcal{L}_{SBO}(x_i)) \qquad \text{[Equation 3]}$$

$$\mathcal{L}_j = \frac{1}{|Y_j|}\sum_{i \in Y_j}(\alpha\mathcal{L}_{MLM}(x_i) + \beta\mathcal{L}_{SBO}(x_i))^2 - \qquad \text{[Equation 4]}$$

$$\left(\frac{1}{|Y_j|}\sum_{i \in Y_j}\alpha(\mathcal{L}_{MLM}(x_i) + \beta\mathcal{L}_{SBO}(x_i))\right)^2$$

$$\mathcal{L}_j = \max_{i \in Y_j}(\alpha\mathcal{L}_{MLM}(x_i) + \beta\mathcal{L}_{SBO}(x_i)) \qquad \text{[Equation 5]}$$

In Equations 3 to 5, $Y_j$ represents the set of tokens consisting of $j^{th}$ log line.

In addition, a loss for a token subsequence to be determined is calculated as Equation 6 and Equation 7, and when a result of the calculation exceeds a threshold value ($\gamma$), it may be determined that the sequence is an abnormal token sequence.

$$Z = \sum_{j=0}^{\mu-1}\mathcal{L}_{\pi_j} \qquad \text{[Equation 6]}$$

$$\begin{cases} Z \geq \gamma, & \text{Abnormal} \\ Z < \gamma, & \text{Normal} \end{cases} \qquad \text{[Equation 7]}$$

In Equations 6 and 7, Z represents a loss for a token subsequence to be determined, $\pi$ represents the permutation satisfying $\mathcal{L}_{\pi_j} \geq \ldots \geq \mathcal{L}_{\pi_{(j-1)}}$, J represents the number of log lines in the input token sequence, and $\gamma$ represents the threshold value.

According to the embodiments described above, system log anomalies may be effectively determined in a way of adopting, when the cut-and-paste technique is applied to anomaly detection based on a language model, a method of training a sentence classification model using generation of a preprocessed normal token sequence and an abnormal token sequence generated from the normal token sequence, calculating an anomaly score for a determination target token sequence input into the sentence classification model, and comparing the calculated anomaly score with a threshold value.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of detecting anomalies in a system log on the basis of self-supervised learning, the method comprising the steps of:

performing preprocessing on the system log;

generating a normal token sequence having a preset length by concatenating tokenized log lines of the system log;

generating an abnormal token sequence using the normal token sequence;

calculating an anomaly score for a determination target token sequence using a sentence classification model;

determining, when the calculated anomaly score is greater than a threshold value, the token sequence as an abnormal system log, wherein the determining includes sequentially selecting and masking token subsequences in units of log lines from the determination target token sequence; and inputting the normal token sequence and the abnormal token sequence into the sentence classification model, and training the sentence classification model to minimize a preset loss.

2. The system log anomaly detection method according to claim 1, wherein the determining step further includes the step of calculating a loss for each sequentially selected and masked token subsequence.

3. The system log anomaly detection method according to claim 2, wherein the determining step further includes the step of determining an abnormal token sequence on the basis of an anomaly score obtained by summing the calculated loss of each token subsequence.

4. The system log anomaly detection method according to claim 1, wherein the step of generating an abnormal token sequence uses a method of deleting some log lines among the log lines of the normal token sequence.

5. The system log anomaly detection method according to claim 1, wherein the step of generating an abnormal token sequence uses a method of adding log lines generated at other arbitrary time points to the normal token sequence.

6. The system log anomaly detection method according to claim 1, wherein the step of generating an abnormal token sequence uses a method of swapping some log lines of the normal token sequence with log lines generated at different time points.

7. The system log anomaly detection method according to claim 1, wherein the step of calculating an anomaly score includes the step of calculating the anomaly score using a negative log likelihood (NLL) of a Gaussian density estimation (GDE) or a kernel density estimation (KDE) for a feature vector obtained from the sentence classification model.

8. The system log anomaly detection method according to claim 1, wherein the step of performing preprocessing includes the steps of:

removing numbers and special characters from the system log; and removing single alphabets with leading and trailing spaces or alphabets of a specific length or shorter.

9. The system log anomaly detection method according to claim 1, wherein the step of performing preprocessing includes the step of converting each log line, from which the alphabets are removed, into a token subsequence using a tokenizer.

10. The system log anomaly detection method according to claim 9, wherein the step of performing preprocessing further includes the step of, when a length of the token subsequence generated through the converting step is greater than an arbitrary first length, allowing the length of the generated token subsequence to be only as long as the first length.

11. The system log anomaly detection method according to claim 1, wherein the step of generating a normal token sequence includes the step of generating a normal token sequence, of which a maximum length is a second length, by concatenating token subsequences.

12. The system log anomaly detection method according to claim 11, wherein the step of generating a normal token sequence further includes the step of inserting a special token between two adjacent token subsequences to distinguish the two token subsequences.

13. An apparatus for detecting anomalies in a system log on the basis of self-supervised learning, the apparatus comprising:

a processor; and a memory for storing at least one command executed by the processor, wherein the processor is configured to perform, by the at least one command, the steps of:

performing preprocessing on the system log;

generating a normal token sequence having a preset length by concatenating tokenized log lines of the system log;

generating an abnormal token sequence using the normal token sequence;

calculating an anomaly score for a determination target token sequence using a sentence classification model;

determining, when the calculated anomaly score is greater than a threshold value, the token sequence as an abnormal system log, wherein the determining includes sequentially selecting and masking token subsequences in units of log lines from the determination target token sequence, calculating a loss for each sequentially selected and masked token subsequence, and determining an abnormal token sequence on the basis of an anomaly score obtained by summing the calculated loss of each token subsequence; and inputting the normal token sequence and the abnormal token sequence into the sentence classification model, and training the sentence classification model to minimize a preset loss.

14. The system log anomaly detection apparatus according to claim 13, wherein at the step of generating an abnormal token sequence, the processor deletes some log lines among the log lines of the normal token sequence.

15. The system log anomaly detection apparatus according to claim 13, wherein at the step of generating an abnormal token sequence, the processor adds log lines generated at other arbitrary time points to the normal token sequence.

16. The system log anomaly detection apparatus according to claim 13, wherein at the step of generating an abnormal token sequence, the processor swaps some log lines of the normal token sequence with log lines generated at different time points.

* * * * *